United States Patent [19]

Wall et al.

[11] 3,902,935

[45] Sept. 2, 1975

[54] STABLE PROPELLANT COMPOSITIONS CONTAINING CARBOXYL-TERMINATED POLYALKADIENE WITH IMINE-EPOXIDE CURING AGENT

[75] Inventors: Bobby M. Wall; Grant Thompson, both of Brigham City, Utah

[73] Assignee: Thiokol Corporation, Bristol, Pa.

[22] Filed: Jan. 29, 1964

[21] Appl. No.: 342,593

[52] U.S. Cl. ........... 149/19.9; 149/19.6; 149/19.91; 260/96 R; 260/78.4 R
[51] Int. Cl................................................ C06d 5/06
[58] Field of Search ........ 149/19, 19.6, 19.9, 19.91; 260/96 R, 78.4 R

[56] References Cited
UNITED STATES PATENTS

| | | | |
|---|---|---|---|
| 3,147,161 | 9/1964 | Abere et al. | 149/19 |
| 3,155,552 | 11/1964 | Vriesen | 149/19 |

*Primary Examiner*—Benjamin R. Padgett
*Attorney, Agent, or Firm*—Thomas W. Brennan

EXEMPLARY CLAIM

1. A method for stabilizing propellant compositions containing carboxyl terminated hydrocarbon fuel binder, oxidizer and propellant adjuvants, from the adverse effects of aging at elevated temperatures, comprising incorporating into said propellant compositions prior to curing, from about 0.50 to 6.0 percent by weight of a imine/epoxide curing composition, said curing composition consisting essentially of epoxide resin and an imine curing agent selected from the group consisting of tri(aziridinyl)phosphine oxides and tri(aziridinyl) phosphine sulfides in the proportion of about 10.0 to 1 parts by weight of imine for each part by weight of epoxide resin.

20 Claims, No Drawings

STABLE PROPELLANT COMPOSITIONS CONTAINING CARBOXYL-TERMINATED POLYALKADIENE WITH IMINE-EPOXIDE CURING AGENT

This invention relates to a method of stabilizing propellant compositions from the adverse effect of aging at elevated temperatures.

More particularly this invention concerns the stabilization of propellant compositions containing an imine cured carboxyl terminated fuel binder.

Carboxyl terminated hydrocarbon resins; particularly carboxyl terminated polybutadiene resins have been used as fuel binders in solid propellant formulations. For this purpose the resins offer several advantages. For example, like unmodified hydrocarbon resins polyalkadiene resins are relatively inert and compatible with various oxidizers including the perchlorates, nitrates and some nitroformates. Especially useful for this purpose are the carboxyl terminated polybutadiene resins. When these resins are formulated with stoichiometric quantities of oxidizer and necessary propellant adjuvants, they give rise to highly energetic solid propellant compositions. Further advantages of these resins as binders are their ease of manufacture, commercial availability, uniform and ready ignition, good physical properties and nonhygroscopicness.

Conventionally carboxyl terminated hydrocarbon resins have been cured using either of two classes of curing agents, imines or epoxy resins.

When either of these prior art curing systems -aziridinyl)phosphine separately to cure the uncompounded resin stock, free from significant quantities of interfering substances, a satisfactory and stable cure is obtained. The cured resins are flexible and mechanically strong and retain these characteristics even after storage for extended periods of time at relatively high temperatures.

However, when these same carboxyl terminated hydrocarbons such as the carboxyl terminated polybutadienes are cured in the presence of large amounts of oxidizer using either of the prior art curing agents separately, the cure is less than satisfactory. For example, the imine cured carboxyl terminated polymers degrade upon prolonged storage especially at elevated temperatures. The opposite effect is observed when epoxy resin alone is used as the curing agent. For example, while a cured propellant composition containing 11.5% by weight of carboxyl terminated polybutadiene polymer and 70% by weight of ammonium perchlorate and 18% by weight of aluminum powder can be obtained by curing with 0.50% by weight MAPO*, the cured propellant degrades and softens upon storage at temperatures of 65°C or above to a gummy consistency.

MAPO is Interchemical Corporation's designation for tris(1-(2-methyl) aziridine) phosphine oxide As indicated above, when the same type of propellant composition containing the same proportion of oxidizer is cured solely with an epoxy resin as is taught by the prior art, a cured propellant is obtained which progressively hardens under the same high temperature storage conditions to a brittle state.

In either instance, the cured, aged compositions are useless as propellants particularly for military retaliatory systems which require long term storage capabilities under a variety of climatic conditions.

Since propellant compositions useful for aerospace and military applications must be ballistically stable and ignitable, even after prolonged storage at temperature extremes ranging from −80°F to 180°F, the present methods for curing carboxyl terminated hydrocarbon resins contained in propellant compositions leave much to be desired.

Thus it is an object of this invention among many others to develop a new method of curing carboxyl terminated polybutadiene resins in the presence of large quantities of oxidizing agents.

It is a further object of this invention to prepare a novel cured propellant compositions stable and utilizable even after prolonged storage at elevated temperatures.

Yet a more specific object of this invention is to prepare stable, cured propellant compositions containing carboxyl terminated polybutadiene fuel binder, metal additive, and ammonium perchlorate oxidizer.

A more general object of this invention is to cure carboxyl terminated polyalkadiene polymers in the presence of large quantities of powerful oxidizing agents.

Related objects of this invention are the preparation of carboxyl terminated hydrocarbon resins of diverse structure for sealant, potting and casting applications.

Other objects implicitly suggested herein will become apparent to those skilled in the art after a further perusal of this patent application.

The above objects among others can be achieved by combining, in critical proportions, the separate imine curing agents and epoxy curing agents of the prior art into one novel curing composition. These novel curing compositions whose essential components are the imine and epoxy curing agents can be augmented with small quantities of various accelerators, catalysts and additives referred to herein as curing catalysts.

In practice, superior cured compositions are produced by mixing, agitating, or in some manner thoroughly blending a propellant composition containing oxidizer, carboxyl terminated fuel binder, propellant adjuvants and the above described curing composition of this invention, until a homogeneous and uniform propellant composition is produced. The homogeneous propellant composition is then cast and cured at an elevated temperature until the desired state of cure is obtained. In all instances, the blending, casting and curing operations are performed on commercially available equipment by techniques well described in the technical literature.

Thus the solid propellant compositions of this invention are composed esssentially of:

1. from about 20-80% by weight of an oxidizer such as the perchlorates, nitrates or nitroformates. The preferred oxidizer is ammonium perchlorate although the other alkali metal perchlorates can be satisfactorily employed depending upon the results desired.

2. from about 15-35% by weight of a carboxyl terminated hydrocarbon polymeric fuel binder. These carboxyl terminated polymeric fuel binders are prepared by polymerizing or reacting many materials including conjugated dienes containing from 4 to 12 carbon atoms, preferably 4 to 8 carbon atoms such as 1,3 butadiene, isoprene, piperylene, methylpentadiene, 2-ethyl-1,3 butadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkly styrenes, paramethoxystyrene, vinylnaphthalene, vinyltoluene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 2-methyl-5-vinylpyridine, 3.5-diethyl-4-vinylpyridine, etc; similar mono- and di-substituted alkenyl pyridines and the like quinolines; acrylic acid esters, such as methyl acrylate, ethyl acrylate; alkacrylic acid esters, such as methyl methacrylate, ethyl methacrylate, propyl methacrylate, isopropyl methacrylate, butyl methacrylate, methyl, vinyl ether, vinyl chloride, vinylidene chloride, vinyfuran, vinylcarbazole, vinylacetylene, etc.

The above compounds in addition to being polymerizable alone are also copolymerizable with each other and may be copolymerized to form terminally reactive polymers. In addition, copolymers can be prepared, using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The polymeric fuel binders can range in molecular weight from 250-12,000 or more, although the most satisfactory results have been obtained using carboxyl terminated hydrocarbon polymers ranging in molecular weight between 500–6,000. Especially favored are carboxyl terminated polybutadienes of that molecular weight range.

3. from about 0.50 to 6.00% by weight of the novel curing composition. As indicated earlier the curing composition is composed of an epoxy resin curing agent and an imine curing agent in the ratio of 1–10 parts by weight of imine to each part of epoxide depending upon the particular imine and the functionality of the epoxide resin. Where the preferred imine tris (1(2-methyl) aziridine) phosphine oxide (MAPO) is used in conjunction with a trifunctional epoxide resin such as ERLA–0500 (Union Carbide Plastics Co., New York 17, N.Y.), superior results have been obtained using a narrower ratio of 2–8 parts by weight of imine to 1 part by weight of trifunctional epoxide resin. The preferred ratio in this instance is 4.0 to 1 parts by weight of MAPO to each part of trifunctional epoxide. Additional imines which can be used in the curing composition as the imine component include any structurally related imine or a mixture of these imines. Illustrative imines include various tri(aziridinyl) phosphine oxides or sulfides such as the following:

tri(1-aziridinyl)phosphine oxide,
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-mehtyl-3-n-butyl-1-aziridinyl)phosphine oxide,
tri(2-hexyl-1-aziridinyl)phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphene oxide,
tri(2-dodecyl-1-aziridinyl)phosphine oxide,
tri(2-methyl-3-tridecyl-1-aziridnyl)phosphine oxide,
tri(2-ethyl-3-octadecyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-ethyl-3-cyclohexyl-1-aziridinyl)phosphine oxide,
tri(2-n-butyl-3-(4-methylcyclohexyl)1-aziridinyl)phosphine oxide,
tri(2-phenyl-1-aziridinyl)phosphine oxide,
tri(2-phenyl-3-tetradecyl-1-aziridinyl)phosphine oxide,
tri(2,3-diphenyl-1-aziridinyl)phosphine oxide,
tri(2-tert-butyl-3-phenyl-1-aziridinyl)phosphine oxide,
tri(2-ethyl-3-(1-naphthyl)1-aziridinyl)phosphine oxide,
tri(2-n-propyl-3-(2-naphthyl)1-aziridinyl)phosphine oxide,
tri(2-methyl-3-benzyl-1-aziridinyl)phosphine oxide,
tri(2-nonyl-3-benzyl-1-aziridinyl)phosphine oxide,
tri(2-n-propyl-3-(2-phenylethyl)1-aziridinyl)phosphine oxide,
tri(2-methyl-3-(4-methylphenyl)1-aziridinyl)phosphine oxide,
tri(2-ethyl-3-(3-n-propylphenyl)1-aziridinyl)phosphine oxide,
tri(2-ethyl-3-(3-n-propylphenyl)1-aziridinyl)phosphine oxide,
tri(2-heptyl-3-(2,4-dimethylphenyl)1-aziridinyl)phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aziridinyl)phosphine sulfide, and
tri(2-amyl-3-benzyl-1-aziridinyl)phosphine sulfide.

Additional epoxide resins which can be used normally include any commerical epoxide resin falling within this general specification range:

| | |
|---|---|
| Epoxy equivalence/100 grams | 0.85 to 1.50 |
| Functionality | 2.0 to 4.0 |
| Molecular weight | 1.50 to 5.00 |

As indicated by the specifications listed above the epoxy resin can be of diverse structure either aliphatic, aromatic, or hetrocyclic. Apparently the non epoxide portion of the resin does not play an important part in the curing mechanism. For example, satisfactory results have been obtained when alkyl, alkene, alkyne or various aromatic epoxides have been utilized. The main requirement being that at least one, preferably two or more reactive epoxide groups are available in the molecule.

Resins falling within this specification are manufactured by many prominent manufacturers and illustrative resins are described in their sales literature. Illustrative examples are ERLA-0510, EO-1000*, and EPON 801-X**.

In addition to the imine-epoxide mixture that makes up the major proportion of the curing composition, various curing catalysts can expeditiously be added to the curing composition to speed up the curing cycle. Favored curing catalysts are the iron salts of fatty acids. These include iron salts of acids such as butyric, valeric, caproic, linoleic, caprylic and the like. These salts while not contributing to the mechanical strength or stability of the cured propellant accelerate the epoxy/-carboxyl portion of the cure, particularly at lower (less than 50°C) temperatures.

4. up to 10% by weight of propellant adjuvants. In addition to the curing agents, solvents, polymerization and vulcanization catalysts and the like which are included within the fuel binder content of the inventive propellant compositions, certain additives, itnition catalysts conditioning or modifying agents can often be advantageously added to the propellant compositions to alter or improve their physical and combustion characteristics. For convenience sake, these substances are herein generically referred to as propellant adjuvants and they can be present in the finished propellant composition in amounts from up to about 30 parts by weight down to 0 parts by weight of the final propellant composition.

More commonly however, the adjuvants comprise from about 20 parts by weight or even less down to about 5 parts by weight of the propellant composition. Among the many propellant adjuvants which can be used are included the following typical materials. Plasticizers such as the alkylphthalates and the like, and darkening agents such as carbon black or lamp black, ballistic agents such as potassium sulfate, hygroscopicity inhibitors, such as dinitro-toluene and various combustion catalysts. The combustion catalysts are of diverse structure but generally are compounds containing oxygen. These catalysts can be inorganic or organic compounds. They include, amony many others, oxides, such as ferrous, ferric, magnesium, titanium, calcium, molybdenum, and vanadium oxides and the like. Especially effective as combustion catalysts are the chromates and dichromates, generally with ammonium dichromate being a preferred catalyst. Organics such as nitrocellulose can also be effectively used.

A favored group of adjuvants are the finely divided high energy metal and non-metals such as aluminum, beryllium, boron, silicon and the like. These materials can be used untreated or they can be employed in the form of their polymer coated particles.

PREFERRED PROPELLANT COMPOSITIONS

As indicated supra for various reasons including better stability, physical and propulsion characteristics, cost and availability, certain of the novel propellants prepared by the novel process of this invention are preferred to others. In this instance the preferred propellant compositions of this invention are made up of:

1. from about 20–80% of ammonium perchlorate
2. from about 15–35% by weight of a carboxyl terminated polybutadiene having a molecular weight between about 500–6000
3. from about 0.50–6.0% by weight of a curing composition composed essentially of from 0.05 to 1.0% by weight of iron octotate curing catalyst and from 0.50 to 5.0% by weight of an imine epoxide curing composition. The latter curing composition is made up of from 1 to 10 parts by weight of tris (1-(2-methyl) aziridine) phosphine oxide (MAPO) to each part by weight of trifunctional epoxide resin.
4. from about 4–24% by weight of finely divided aluminum powder propellant adjuvant.

COMPOUNDING THE INGREDIENTS

In preparing the curable solid propellant composition the following preferred procedure among others can be used.

The dried, powdered propellant adjuvants such as aluminum are premixed with the carboxyl terminated fuel binder and are blended into the oxidizer contained in a mixer equipped with an efficient spark proof motor. After a mixing period ranging from ½ to 1 hour, the curing compoisition of imine, epoxide and curing catalysts are added and the mixing continued an additional 178 to 2 hours, until a homogeneous propellant composition is produced.

The homogeneous uncured propellant composition is then poured into an engine casing and the composition is cured at the required temperature until the desired degree of hardness is obtained. The curing time and temperatures are dependent upon the particular resin used as a binder and the batch size, among other things and thus cannot be stated with precision. However, the following ranges of time and temperature are typical for curing a propellant composition containing the fuel binders listed below:

| BINDER | Range of Curing Temperature | Range Curing Times |
| --- | --- | --- |
| Thiokol HC | 100–170°F | 24–300 hours |
| Thiokol HB | 100–170°F | 24–300 hours |
| Thiokol HA | 100–170°F | 24–300 hours |
| Thiokol carboxyl terminated carborane polyester | 50–160°F | 24–120 hours |

In one favored embodiment of this invention using the mixing apparatus and techniques described above the following propellant components are mixed in a mixing vessel.

| COMPONENT | PARTS BY WEIGHT |
| --- | --- |
| HC Polymer | 13.34 |
| MAPO | .42 |
| Iron Linoleate | .10 |
| ERLA - 0510 | .14 |
| Plasticizer | 2.00 |
| $NH_4ClO_4$ | 69.00 |
| $Fe_2O_3$ | 3.00 |
| Aluminum | 12.00 |
| | 100.00 |

The propellant was cured for 144 hours at 135° F to give a mechanically strong propellant which did not appreciably postcure or degrade upon storage at 175° F for periods up to 90 days.

In another embodiment of this invention substantially the same composition is prepared using another imine-epoxy pair.

| COMPONENT | PARTS BY WEIGHT |
|---|---|
| HC Polymer | 13.25 |
| MAPS | .60 |
| ED-1000 | .15 |
| Aluminum | 16.00 |
| $NH_4Cl_4$ | 70.00 |
| | 100.00 |

In yet another embodiment the favored system of above is followed except that $KClO_4$ was substituted for ammonium perchlorate and MAPO was substituted for MAPS. Mixing and curing was as before.

| COMPONENT | PARTS BY WEIGHT |
|---|---|
| HC Polymer | 21.00 |
| MAPO | .80 |
| ERLA-0510 | .20 |
| Aluminum | 16.00 |
| $KClO_4$ | 62.00 |
| | 100.00 |

A further embodiment of this invention was repeated by mixing and curing as before the following components.

| COMPONENTS | PARTS BY WEIGHT |
|---|---|
| Butarez CTL (II) | 13.48 |
| MAPO | .39 |
| EPON 801-X | .13 |
| Aluminum | 16.00 |
| $NH_4ClO_4$ | 70.00 |
| | 100.00 |

This invention is advantageous and surprising in both its process and composition aspects. For example, while it is known to cure carboxyl terminated resins with either epoxy resins or imines, the combination of both of these curing agents is heretofore unreported. Furthermore carboxyl terminated polybutadiene resins cured in the presence of large quantities of oxidizer are unsatisfactory. This is true when either epoxide cure or an imine cure is used. Both types of cures result in an unsatisfactory composition after aging at elevated (175° F or more) temperatures. Thus it is extremely unexpected to find that certain critical ratios of imine to epoxy curing agents will overcome the difficulties introduced by the presence of large quantities of oxidizer. It is perhaps even more surprising to find that combining the two curing systems has a synergistic like effect in that the mechanical strength of the resins is preserved during aging at elevated temperatures, whereas the effect of each curing agent separately was unsatisfactory.

In its composition aspects this invention is also advantageous. For example, the cured compositions have superior physical properties which are retained upon storage even at elevated temperatures. These include Shore Hardness A, tensile strength, elongation, modulus of elasticity and the like. A further advantage is the formulating versatility of the system. The oxidizer propellant adjuvants and curing composition can be varied as long as an appropriate imine and epoxide resin is present in at least stoichiometric quantities.

Further advantages as well as data substantiating the stablizing influence of the novel imine epoxide curing compositions of this invention are described in detail in the illustrative examples which follow:

EXAMPLE 1.

Comparison of Aging Effects upon Imine Cured, Epoxide Cured and Imine-Epoxy Cured Propellants In these experiments, propellant compositions containing 70% by weight ammonium perchlorate, 16% by weight of aluminum powder and 11 to 11.50% by weight of a carboxyl terminated polybutadiene polymer (Thiokol HC–434) are cured with 7 different curing systems. Systems 1–5 are MAPO - ERLA – 0500 (trifunctional epoxide resin, sold by Union Carbide Plastics Co., N.Y. 17, N.Y.) varying in MAPO: Epoxide Ratio from 3:1 to 6:1, while system 6 is the prior art straight (.35% by weight) MAPO cure. System 7 is the straight Epoxide (ERLA 0500 1.0% by weight) cure of the prior art. The propellants are prepared using the standard techniques and equipment described previously.

The effect of the ratio between the imine and the epoxy resin upon the aging characteristics of the propellant is presented in Table I. Analysis of this data shows that an imine/epoxy ratio of 4.6 to 6.0/1.0 gives good aging stability at 170° F.

TABLE I.

| EFFECT OF IMINE/EPOXY RATIO ON THE AGING CHARACTERISTICS | | | | | | | |
|---|---|---|---|---|---|---|---|
| Curing Agent: Imine/Epoxy Ratio* | 3.0:1 | 3.8:1 | 4.6:1 | 5.4:1 | 6.0:1 | Straight Imine | Straight Epoxide |
| Initial Cure: 144 hrs./135°F | | | | | | | |
| Modulus, psi | 735 | 509 | 726 | 739 | 646 | 456 | 600 |
| Stress, psi | 150 | 119 | 142 | 146 | 135 | 100 | 100 |
| Strain, in./in. | .30 | .35 | .36 | .34 | .34 | .34 | 0.28 |
| Aged 3 Days/170°F | | | | | | | |
| Modulus, psi | — | 756 | 739 | 673 | 642 | — | |
| Stress, psi | —157 | 139 | 142 | 120 | — | | |
| Strain, in./in. | — | .32 | .35 | .36 | .33 | — | |
| Aged 1 Week/170°F | | | | | | | |
| Modulus, psi | —926 | 862 | 741 | 607 | 217 | 850 | |
| Stress, psi | — | 186 | 162 | 140 | 118 | 53 | 110 |
| Strain, in./in. | — | .33 | .34 | .35 | .33 | .31 | 0.26 |
| Aged 2 Weeks/170°F | | | | | | | |
| Modulus, psi | 1488 | 945 | 807 | 742 | 639 | 288 | 1042 |
| Stress, psi | 198 | 173 | 155 | 140 | 118 | 44 | 129 |
| Strain, in./in. | .34 | .34 | .33 | .33 | .32 | .30 | 0.25 |

TABLE I.

EFFECT OF IMINE/EPOXY RATIO ON THE AGING CHARACTERISTICS

| Curing Agent: Imine/Epoxy Ratio* | 3.0:1 | 3.8:1 | 4.6:1 | 5.4:1 | 6.0:1 | Straight Imine | Straight Epoxide |
|---|---|---|---|---|---|---|---|
| Aged 3 Weeks/170°F | | | | | | | |
| Modulus, psi | 1610 | 1017 | 931 | 935 | 693 | 275 | 1900 |
| Stress, psi | 251 | 188 | 174 | 158 | 130 | 21 | 188 |
| Strain, in./in. | .34 | .32 | .33 | .33 | .34 | .36 | 0.20 |

*This ratio of imine to epoxy resin is based on chemical equivalents and not weight in this table.

As the above example and embodiments indicate, numerous changes and modifications can be made in the experimental conditions, curing agents and the like without departing from the invention concept. This invention is best described by the claims which follow.

We claim:

1. A method for stabilizing propellant compositions containing carboxyl terminated hydrocarbon fuel binder, oxidizer and propellant adjuvants, from the adverse effects of aging at elevated temperatures, comprising incorporating into said propellant compositions prior to curing, from about 0.50 to 6.0 percent by weight of a imine/epoxide curing composition, said curing composition consisting essentially of epoxide resin and an imine curing agent selected from the group consisting of tri(aziridinyl)phosphine oxides and tri(aziridinyl) phosphine sulfides in the proportion of about 10.0 to 1 parts by weight of imine for each part by weight of epoxide resin.

2. The method of claim 1 wherein the carboxyl terminated hydrocarbon fuel binder is a carboxyl-terminated polyalkadiene.

3. The method of claim 2 wherein the carboxyl terminated polyalkadiene is a carboxyl-terminated polybutadiene having a molecular weight between about 500 – 6000.

4. A method of stabilizing propellant compositions containing carboxyl terminated polybutadiene fuel binder, perchlorate oxidizer and propellant adjuvants, from the adverse effects of aging at elevated temperatures comprising incorporating into the propellant composition prior to curing, 0.30 to 2.0 percent by weight of imine/epoxide curing composition, said curing composition being composed essentially of epoxide curing agent and an imine curing agent selected from the group consisting of tri(aziridinyl)phosphine oxides and tri(aziridinyl)phosphine sulfides in the proportion of about 10.0 to 1 parts by weight of imine for each part by weight of epoxide resin.

5. The method of claim 4 wherein the carboxyl terminated polyalkadiene has a molecular weight ranging between about 500 – 6000, the perchlorate oxidizer is ammonium perchlorate and the imine curing agent is tris (1-(2-methyl)aziridine)phosphine oxide.

6. The method of claim 4 wherein the carboxyl terminated polyalkadiene has a molecular weight ranging between about 500 – 6000, the perchlorate oxidizer is ammonium perchlorate and the imine curing agent is tris (1-(2-methyl)aziridine)phosphine sulfide.

7. A curable homogenous solid propellant composition composed essentially of:
  1. from about 20–80% by weight of oxidizer.
  2. from about 15–35% by weight of carboxyl terminated hydrocarbon fuel binder.
  3. from about 0.50 –6.0% by weight of a curing imine/epoxide composition and curing catalysts, the imine being selected from the group consisting of tri(aziridinyl)phosphine oxides and tri(aziridinyl) phosphine sulfides and being present in the proportion of from about 10 to 1 parts by weight of imine to each part by weight of epoxide.
  4. from about 0 0 10% by weight of propellant adjuvants.

8. The composition of claim 7 wherein the carboxyl terminated hydrocarbon fuel binder is a carboxyl terminated polyalkadiene.

9. The composition of claim 8 wherein the carboxyl terminated fuel binder is a carboxyl terminated polybutadiene having a molecular weight ranging from about 500 – 6000.

10. A curable homogeneous solid propellant composition composed essentially of:
  1. from about 20 – 80% by weight of perchlorate oxidizer.
  2. from about 15 – 35% by weight of carboxyl terminated polyalkadiene fuel binder.
  3. from about 0.5 – 6.0% by weight of imine/epoxide curing composition and curing catalysts, the imine being selected from the group consisting of tri(aziridinyl)phosphine oxides and tri(aziridinyl) sulfides and being present in the proportion of from about 10 – 1 parts by weight of imine to each part by weight of epoxide.
  4. from about 0 – 10% parts by weight of propellant adjuvants.

11. The solid propellant composition of claim 10 wherein
  1. the oxidizer is ammonium perchlorate.
  2. the fuel binder is a carboxyl terminated polybutadiene.
  3. the imine curing agent is tris (1-(2-methyl)aziridine) phosphine oxide.

12. The solid propellant composition of claim 10 wherein
  1. The oxidizer is ammonium perchlorate.
  2. the fuel binder is a carboxyl terminated polybutadiene.
  3. the imine curing agent is tris(1-(2-methyl)aziridine) phosphine sulfide.

13. A curable homogeneous solid propellant composition composed essentially of:
  1. from about 20–80% by weight of ammonium perchlorate.
  2. from about 15–35% by weight of carboxyl terminated polybutadiene having a molecular weight of from about 500 – 6000.
  3. from about 0.30 – 2.0% by weight of imine/epoxide curing composition and curing catalysts, said curing composition being composed of tris(1-(2-methyl)aziridine)phosphine oxide epoxide resin in the proportion of about 4 – 1% by weight of tris(1-(2-methyl) aziridine) phosphine oxide to each part by weight of epoxide.
  4. from about 1 – 24% by weight of aluminum powder.

14. A curable homogeneous solid propellant composition composed essentially of:
1. from about 20–80% by weight of ammonium perchlorate.
2 from about 15 – 35% by weight of carboxyl terminated polybutadiene having a molecular weight of from about 500 – 6000.
3. from about 0.30 – 2.0% by weight of imine/epoxide curing composition and curing catalysts, said curing composition being composed of tris(1-(2-methyl)aziridine)phosphine sulfide epoxide resin in the proportion of about 4 – 1% by weight of tris (1-(2-methyl) aziridine)Phosphine sulfide to each part by weight of epoxide.
4. from about 1 – 24% by weight of aluminum powder.

15. A method of curing liquid carboxyl terminated hydrocarbon resins comprising the steps of admixing with said liquid resins a 0.5 to 6.0% by weight portion of imine epoxide curing compositions, said curing composition being composed essentially of 10 to 1 parts by weight of imine to each part by weight of epoxide resin, said imine being selected from the group consisting of tri(aziridinyl) phosphine oxides and tri(aziridinyl) phosphine sulfides, and heating said admixed liquid resin curing composition mixture to an elevated temperature until a satisfactory state of cure is obtained.

16. The method of claim 15 wherein the liquid carboxyl terminated hydrocarbon resin is a polyalkadiene.

17. The method of claim 16 wherein the liquid carboxyl terminated polyalkadiene is a carboxyl terminated polybutadiene having a molecular weight of between 500 – 6000.

18. A method of curing liquid carboxyl terminated polybutadiene resins having a molecular weight between 500 – 6000 comprising the steps of admixing with said liquid resins a 0.5 to 6.0% by weight portion of a curing composition, said curing composition being composed essentially of imine curing agent selected from the group consisting of tri(aziridinyl)phosphine oxides and tri(aziridinyl)phosphine sulfides and epoxide curing agent, in the proportion of from about 2 to 1 parts by weight of an imine to each part by weight of epoxide and heating said admixed liquid resin curing composition mixutre to a temperature to between about 100° to 170° F for a period ranging from 24 to 300 hours.

19. The method of claim 18 wherein the imine is tris(1-(-methyl) aziridine)phosphine oxide and the epoxide is trifunctional.

20. The method of claim 18 wherein the imine is tris (1-(2-methyl) aziridine)phosphine sulfide and the epoxide is trifunctional.

* * * * *

UNITED STATES PATENT OFFICE
CERTIFICATE OF CORRECTION

Patent No. 3902935                  Dated September 2, 1975

Inventor(s) Bobby M. Wall and Grant Thompson

It is certified that error appears in the above-identified patent and that said Letters Patent are hereby corrected as shown below:

Column 1, lines 31-32, strike out "-aziride-nyl) phosphine and insert -- are utilized --;

Column 4, line 61, strike out "apparatently" and insert -- apparently --;

Column 5, line 44 strike out "amony" and insert -- among --;

" ", line 23, strike out "178" and insert -- 17 1/2 --;

Columns 7 & 8, Table I, under 3.0:1 column, strike out "157" and "926";

" " " " ", under 3.8:1 column, strike out "139" and insert -- 157 --;

" " " " ", under 3.8:1 column, strike out "862" and insert -- 926 --

" " " " ", under 4.6:1 column in aged 3 days section, strike out "142" and insert -- 139 --;

" " " " ", under 4.6:1 column, strike out "741" and insert -- 862 --

" " " " ", under 5.4:1 column, strike out "120" and insert -- 142 --

" " " " ", under 5.4:1 column, strike out "607" and insert -- 741 --

UNITED STATES PATENT OFFICE
CERTIFICATE OF CORRECTION

Patent No. 3902935                              Dated September 2, 1975

Inventor(s)   Bobby M. Wall and Grant Thompson

It is certified that error appears in the above-identified patent and that said Letters Patent are hereby corrected as shown below:

Columns 7 & 8, Table I, under 6.0:1 column, remove the dash and insert -- 120 --;

" " ", " ", under 6.0:1 column, strike out "217" and insert -- 607 --;

" " " " ", under Straight Imine column strike out "850" and insert -- 217 --;

" " " " ", under Straight Epoxide column under Aged 1 Week/170°F section, line Modulus psi insert -- 850 --;

Signed and Sealed this thirtieth Day of March 1976

[SEAL]

Attest:

RUTH C. MASON
*Attesting Officer*

C. MARSHALL DANN
*Commissioner of Patents and Trademarks*